United States Patent
Sun et al.

(10) Patent No.: US 9,008,062 B2
(45) Date of Patent: Apr. 14, 2015

(54) SYSTEMS AND METHODS FOR AP DISCOVERY WITH FILS BEACON

(71) Applicant: FutureWei Technologies, Inc., Plano, TX (US)

(72) Inventors: Sheng Sun, Kanata (CA); Yunbo Li, Shenzhen (CN); Kwok Shum Au, Shenzhen (CN); Osama Aboul-Magd, Kanata (CA); Junghoon Suh, Kanata (CA)

(73) Assignee: Futurewei Technologies, Inc., Plano, TX (US)

( * ) Notice: Subject to any disclaimer, the term of this patent is extended or adjusted under 35 U.S.C. 154(b) by 101 days.

(21) Appl. No.: 13/626,482

(22) Filed: Sep. 25, 2012

(65) Prior Publication Data

US 2013/0177002 A1    Jul. 11, 2013

Related U.S. Application Data

(60) Provisional application No. 61/584,584, filed on Jan. 9, 2012.

(51) Int. Cl.
*H04W 48/16* (2009.01)
*H04W 48/12* (2009.01)

(52) U.S. Cl.
CPC .................... *H04W 48/12* (2013.01)

(58) Field of Classification Search
CPC ............... H04W 84/12; H04W 84/18
USPC .............................. 370/338; 379/59
See application file for complete search history.

(56) References Cited

U.S. PATENT DOCUMENTS

| 7,322,044 B2 * | 1/2008 | Hrastar ........................... 726/22 |
| 8,060,099 B2 * | 11/2011 | Julian et al. ................. 455/443 |
| 8,306,520 B2 * | 11/2012 | Julian et al. ................. 455/418 |

(Continued)

FOREIGN PATENT DOCUMENTS

| CN | 101347005 A | 1/2009 |
| CN | 102076060 A | 5/2011 |
| WO | 2011106538 A1 | 9/2011 |

OTHER PUBLICATIONS

IEEE Std 802.11n—2009.*

(Continued)

*Primary Examiner* — Melvin Marcelo
*Assistant Examiner* — Peter Solinsky
(74) *Attorney, Agent, or Firm* — Slater & Matsil, L.L.P.

(57) ABSTRACT

A method and apparatus are disclosed for supporting access point (AP) discovery by a handset/station (STA) using a fast initial link setup (FILS) discovery frame. An embodiment method includes transmitting a plurality of FILS discovery frames at faster time intervals than designated for transmitting standard AP beacons, wherein the FILS discovery frames have a smaller size than standard AP beacons. An embodiment apparatus includes a processor and a computer readable storage medium storing programming for execution by the processor, the programming including instructions to broadcast a standard AP beacon for advertising a basic service set (BSS) repeatedly at subsequent time intervals, and broadcast a FILS discovery frame for advertising the BSS repeatedly at faster subsequent time intervals than for the standard AP beacon, wherein the FILS discovery frame has a smaller size than the standard AP beacon.

22 Claims, 3 Drawing Sheets

(56) References Cited

U.S. PATENT DOCUMENTS

| | | | |
|---|---|---|---|
| 8,379,584 B2* | 2/2013 | Hartman et al. | 370/329 |
| 8,626,073 B2* | 1/2014 | Ruuska | 455/67.11 |
| 2005/0124294 A1* | 6/2005 | Wentink | 455/41.2 |
| 2006/0285507 A1 | 12/2006 | Kinder et al. | |
| 2007/0140163 A1 | 6/2007 | Meier et al. | |
| 2008/0112375 A1* | 5/2008 | Bennett | 370/338 |
| 2009/0274094 A1* | 11/2009 | Engwer | 370/328 |
| 2010/0015927 A1* | 1/2010 | Yuda et al. | 455/69 |
| 2010/0195603 A1* | 8/2010 | Ho | 370/329 |
| 2010/0202339 A1* | 8/2010 | Chieng et al. | 370/312 |
| 2010/0284425 A1* | 11/2010 | Hood | 370/471 |
| 2012/0169541 A1* | 7/2012 | Singh | 342/417 |
| 2013/0094484 A1* | 4/2013 | Kneckt et al. | 370/338 |
| 2013/0107757 A1* | 5/2013 | Cherian et al. | 370/255 |
| 2013/0107788 A1* | 5/2013 | Cherian et al. | 370/312 |
| 2013/0107824 A1* | 5/2013 | Cherian et al. | 370/329 |
| 2013/0107825 A1* | 5/2013 | Cherian et al. | 370/329 |
| 2013/0109313 A1* | 5/2013 | Kneckt et al. | 455/41.2 |
| 2013/0109314 A1* | 5/2013 | Kneckt et al. | 455/41.2 |
| 2013/0111044 A1* | 5/2013 | Cherian et al. | 709/228 |
| 2013/0114463 A1* | 5/2013 | Li | 370/254 |
| 2013/0117820 A1* | 5/2013 | Cherian et al. | 726/4 |
| 2013/0176897 A1* | 7/2013 | Wang et al. | 370/254 |
| 2013/0235852 A1* | 9/2013 | Segev et al. | 370/336 |
| 2013/0243194 A1* | 9/2013 | Hawkes et al. | 380/270 |
| 2013/0247150 A1* | 9/2013 | Cherian et al. | 726/4 |
| 2013/0259020 A1* | 10/2013 | Ullah et al. | 370/338 |
| 2013/0263223 A1* | 10/2013 | Cherian et al. | 726/4 |
| 2013/0281022 A1* | 10/2013 | Mahany et al. | 455/41.2 |
| 2014/0092779 A1* | 4/2014 | Seok et al. | 370/254 |

OTHER PUBLICATIONS

Siep, T., et al., "TGai Spec Framework," Specification Framework for TGai, IEEE P802.11-12/0151r7, Wireless LANs, Jul. 23, 2012, pp. 1-13.

Siep, T., et al., "TGai Spec Framework," Specification Framework for TGai, IEEE P802.11-12/0151r2, Wireless LANs, Jan. 19, 2012, 7 pages.

Li, Y., et al., "AP discovery with FILS beacon," Power Point doc.: IEEE 802.11-12/0042r0, Jan. 8, 2012, 13 slides.

International Search Report and Written Opinion received in International Application No. PCT/CN2013/070263 mailed Apr. 11, 2013, 10 pages.

Extended European Search Report received in Application No. 13735990.7-1854, mailed Nov. 18, 2014, 10 pages.

\* cited by examiner

# SYSTEMS AND METHODS FOR AP DISCOVERY WITH FILS BEACON

This application claims the benefit of U.S. Provisional Application Ser. No. 61/584,584, filed on Jan. 9, 2012, and entitled "Systems and Methods for TGai AP Discovery with FILS Beacon," which is incorporated herein by reference as if reproduced in its entirety.

TECHNICAL FIELD

The present invention relates to the field of wireless communications, and, in particular embodiments, to systems and methods for access point (AP) discovery with fast initial link setup (FILS) beacon.

BACKGROUND

The Institute of Electrical and Electronics Engineers (IEEE) 802.11 is a set of standards for implementing wireless local area network (WLAN or Wi-Fi) communication. A Task Group is developing a standard for IEEE 802.11ai FILS, which is intended to substantially reduce the time for a Wi-Fi handset/station (STA) to connect with a Wi-Fi AP, also referred to sometimes as a wireless access point (WAP). Examples of STAs include computer desktops, laptops, tablets, and smartphones equipped with wireless communication capability. Examples of APs include wireless modems and wireless routers, such as IEEE 802.11 modems/routers. The Task Group for IEEE 802.11ai is also referred to as TGai. IEEE 802.11ai provides a media access control (MAC) layer protocol for fast authentication and association of a Wi-Fi handheld with a Wi-Fi access point.

TGai requires FILS support in APs. In a WLAN, an AP periodically broadcasts a standard beacon frame to advertise the existence of a basic service set (BSS). The period of broadcast is typically about 100 milliseconds (ms), which is equivalent to 10 Hertz (Hz) in frequency. In IEEE 802.11ai, the FILS should be established between a STA and an AP within about 100 ms, including the STA detecting a beacon from the AP and then associating with the corresponding AP and establishing a link. This FILS time requirement is comparable to the typical beacon broadcast period from APs. Since additional time is still needed to associate a STA with an AP after detecting the beacon, meeting the FILS successful total association time requirement represents a challenge in current implementation.

SUMMARY

In one embodiment, a method for supporting access point (AP) discovery is disclosed. The method includes transmitting a plurality of fast initial link setup (FILS) discovery frames at faster time intervals than designated for transmitting standard AP beacons, wherein the FILS discovery frames have a smaller size than standard AP beacons.

In another embodiment, an apparatus for supporting AP discovery is disclosed. The apparatus includes a processor, and a computer readable storage medium storing programming for execution by the processor, the programming including instructions to transmit a plurality of FILS discovery frames at faster time intervals than designated for standard AP beacons, wherein the FILS discovery frames have a smaller size than standard AP beacons.

In yet another embodiment, a network component supporting AP discovery is disclosed. The network component includes a processor, and a computer readable storage medium storing programming for execution by the processor, the programming including instructions to broadcast a standard AP beacon for advertising a basic service set (BSS) repeatedly at subsequent time intervals; and broadcast a FILS discovery frame for advertising the BSS repeatedly at faster subsequent time intervals than for the standard AP beacon, wherein the FILS discovery frame has a smaller size than the standard AP beacon.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
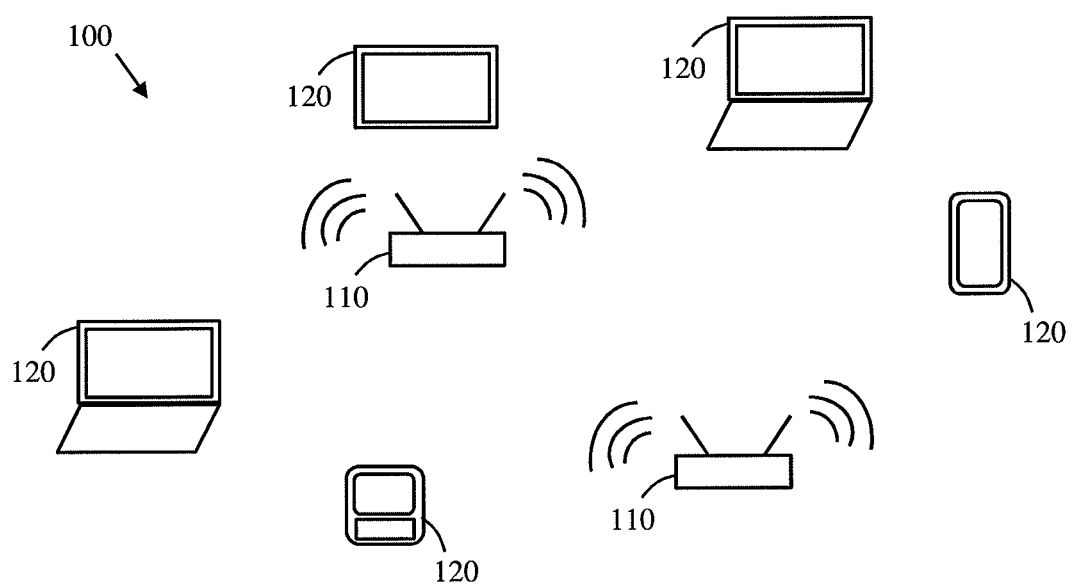
FIG. 1 illustrates an example of a system that supports TGai AP Discovery using a FILS Beacon.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In WLANs, two schemes can be used for enabling handsets/stations (STAs) to discover APs. In a first scheme, a STA waits to receive a beacon from an AP, which may last up to about 100 ms. This scheme is referred to as passive scanning. In a second scheme, a STA sends a probe request and then receives a response from an AP that detects the request. This scheme is referred to as active scanning and is generally faster than the first scheme. A probe request frame is sent from the STA in broadcast mode, and can cause multiple probe responses from multiple listening APs.

In a typical 802.11ai scenario, there are a plurality of STAs that need to associate with an AP. If multiple STAs passively wait for a beacon from the AP, the system becomes inefficient. On the other hand, if the STAs send a probe request, this will flood the network. If the AP sends beacons more frequently, the AP occupies substantial air time. With active scanning, a probe request frame may cause several probe response frames, and hence the probe request/response frames can flood the network when there are multiple STAs. Further, active scanning consumes more power than passive scanning, which may not be suitable for STAs such as mobile devices that are battery consumption critical.

Disclosed herein are system, method, and apparatus embodiments for enabling AP discovery using a FILS discovery beacon. The FILS discovery beacon may be a frame or packet, and is also referred to herein as a FILS discovery frame. The terms FILS discovery beacon and FILS discovery frame are used herein interchangeably. The embodiments allow a STA to discover an AP by detecting a beacon transmitted repeatedly from the AP at shorter or faster subsequent time intervals (e.g., higher frequency) than a typical beacon, which is typically transmitted at a period of 100 ms or other frequency according to IEEE 802.11 standards. The FILS discovery beacon or frame is transmitted with the standard or typical beacon. The FILS discovery frames have a modified` format that comprises less information than a typical beacon format (e.g., IEEE 802.11 or TGai format). The reduced size of the FILS discovery frame in comparison to a typical or regular transmitted beacon avoid occupying substantial air time by the AP. The faster transmission time intervals and the smaller size format are implemented to speed up the AP discovery and meet the FILS total association time requirement, e.g., to allow beacon detection and association between the AP and a STA within about 100 ms. Further, the FILS discovery frame is transmitted at a randomized broadcast pattern (e.g., according to a predefined sequence of transmission and non-transmission phases), as described below. The randomized broadcast pattern improves the chances for faster detection of the FILS discovery frame and avoids a broadcast collision in the case of multiple APs. In another embodiment, the FILS discovery frame is transmitted to broadcast periodically at a relatively higher frequency than standard beacons without using any predefined sequence of transmission and non-transmission phases".

FIG. 1 illustrates a system 100 that comprises one or more APs 110 and one or more STAs 120. The APs 110 and the STAs 120 are configured to support AP discovery using a FILS discovery beacon or frame. The APs 110 include any devices configured to allow the STAs 120 access to one or more communications networks and/or service provider networks, e.g., the Internet, a WLAN, a cellular network, other networks, or combinations thereof. The APs 110 comprise wireless or radio transmitters/receivers that communicate with the STAs 120, e.g., according to the 802.11ai standard or other 802.11 standards (for Wi-Fi). For example, the APs 110 include wireless routers and/or modems, such as 802.11 modems/routers. The STAs 120 include any mobile or personal communication devices configured to exchange data wirelessly with one or more networks via the APs 110. The STAs 120 also comprise wireless or radio transmitters/receivers that communicate with the APs 110, e.g., based on the 802.11ai standard other 802.11 standards (for Wi-Fi). For example, the STAs 120 include laptop computers, tablet computers, and/or smartphones.

Further, the STAs 120 are configured to discover the APs 110 (before associating with the APs 110 and setting up communications) by detecting beacons (e.g., frames) broadcasted by the APs 110 for this purpose. The APs 110 are configured to transmit repeatedly FILS discovery frames at subsequent time intervals less than 100 ms or at faster time intervals than a typical beacon according to 802.11 standards. The STAs 110 are configured to listen or scan for the FILS discovery frames broadcasted by the APs 110. Due to the faster transmission intervals of the FILS discovery beacons or frames, the STAs 120 can detect the beacons or frames and hence discover the broadcasting APs 110 at a shorter time, which may be less than 100 ms. As such, the STAs 110 can still have sufficient time to perform association with the discovered APs 110 and link setup within the FILS total association time requirement of 100 ms according to TGai. The AP discovery scheme using the FILS discovery frame is more efficient than using standard or typical lower rate (or slower interval) beacons (passive scanning) and removes the need to transmit probe requests from the STAs to detect the APs (active scanning).

The APs 110 can also transmit standard or typical beacons, for instance periodically at a period of about 100 ms. Within the standard or typical period, the AP 110 can transmit multiple faster interval FILS beacons. Configuring the APs 110 to transmit both standard beacons and FILS beacons ensures backward system compatibility and does not disturb existing AP discovery schemes in accordance with current WLAN or 802.11 standards.

The FILS discovery beacon also has a modified MAC frame format in comparison to the typical or standard beacon. This MAC frame can be a broadcast MAC management frame that is configured to support faster AP and/or network discovery for FILS. The modified format may carry fewer data elements and hence has a smaller size (or a shorter length) than the typical or standard beacon, which allows the STAs 120 to detect and process the FILS discovery beacon or frame in less time than typical or standard beacons. The smaller size FILS discovery frame also prevents the APs 110 from occupying substantial air time, and thus improves overall system performance. Similar to a standard beacon, the FILS discovery frame is broadcasted to advertise the existence of a BSS. In one embodiment, the FILS discovery frame comprises a service set identifier (SSID) and, optionally, a network identifier. In another embodiment, the FILS discovery frame comprises a SSID and optionally any combination of a robust secure network (RSN) indication, BSS load, and one or more BSS identifiers (BSSIDs). The FILS discovery frame also includes optionally a network identifier. In yet another embodiment, the FILS discovery frame comprises a SSID and optionally any combination of one or more supported rates, a power constraint, a RSN indication, BSS load, a BSS average access delay, one or more BSSIDs. The FILS discovery frame also includes optionally a network identifier.

In any of the formats above, at least some of the data elements in the FILS discovery frame may be compressed, which further reduces the size or length of the FILS discovery frame and hence allow for faster detection and better air time usage. For example, the SSID can be truncated or hashed to reduce the number of bits used for indicating the SSID (e.g., less than 32 bits) in the FILS discovery frame. Alternatively, the data elements can be indicated using a bitmap instead of using direct values (bit sequences).

In an embodiment, the APs 110 are configured to transmit the FILS discovery frames in a randomized pattern. A plurality of transmit modes can be predefined, where each transmit mode defines a sequence of transmission and non-transmission phases, which may be arranged in any random order. By selecting a different transmit mode from the predefined transmit modes at different times, the FILS discovery frames are transmitted in randomized pattern (over time). In one example, a set of 9 transmit modes are predefined as follows: [1 0 1 0 0 0] [1 0 0 1 0 0] [1 0 0 0 1 0] [0 1 0 1 0 0] [0 1 0 0 1 0] [0 1 0 0 0 1] [0 0 1 0 1 0] [0 0 1 0 0 1] [0 0 0 1 0 1], where 1 indicates a transmission phase and 0 indicates a non-transmission phase. Each transmission phase corresponds to a time interval of periodic transmissions of FILS beacons with a period less than the frequency for transmitting standard beacons, e.g., 100 ms according to IEEE 802.11 specifications. Each non-transmission phase corresponds to an equivalent time interval where no FILS beacons are transmitted.

In one embodiment, each AP 110 can select arbitrarily a transmit mode from the set of predefined transmit modes. At the end of the selected transmit mode, the AP 110 can select arbitrarily a next transmit mode from the set. Alternatively, the APs 110 are assigned different sets of predefined sets of transmit modes and select the transmit modes in the sequence indicated in the respective sets. Both scenarios result in asynchronous and randomized transmissions of FILS discovery frames from the different APs 110. This also allows asynchronous STAs 120 waking up at random times to detect faster the broadcasted FILS discovery frames and hence associate faster with the corresponding APs 110.

In another embodiment, at least some of the APs 110 are simply configured to broadcast FILS discovery frames periodically at a relatively higher frequency than standard beacons (e.g., with a period less than 100 ms, of 50 ms, 20 ms, 10 ms, 5 ms, etc.) without using the transmit modes described above. In both embodiments (with and without transmission modes), if the transmission time of a FILS discovery beacon overlaps with that of a standard beacon, then only the standard beacon is transmitted (to maintain backward compatibility). In other embodiments, both transmission schemes (with and without the transmit modes) are implemented by different APs 110 or by the same AP 110 at different times.

Figure 2:
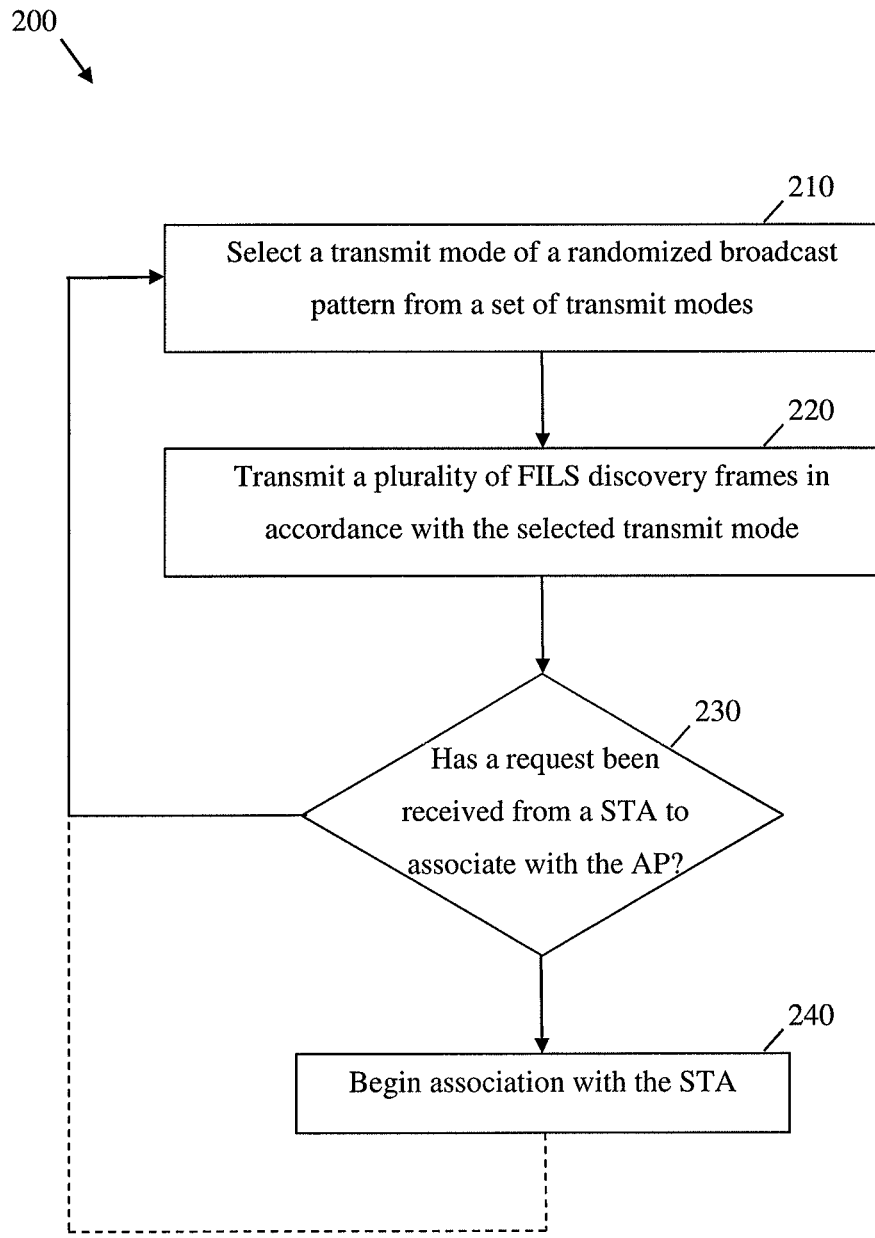
FIG. 2 illustrates an embodiment method for TGai AP discovery using a FILS beacon.

FIG. 2 illustrates an embodiment method 200 for AP discovery using a FILS discovery beacon or frame. The method 200 is implemented by an AP to broadcast FILS discovery frames to one or more surrounding STAs to allow AP discovery and hence association and communication setup between the STA and the AP. For instance, the method 200 is implemented by an AP 110 in the system 100 to broadcast FILS beacons to one or more STAs 120. At step 210, the AP selects a first transmit mode of a randomized broadcast pattern from a set of transmit modes. The transmit modes may be pre-defined or may be generated randomly upon implementation. At step 220, the AP transmits a plurality of FILS discovery frames in accordance with the selected transmit mode. For each transmission phase in the selected transmit mode, the AP transmits a plurality of FILS discovery frames at a higher frequency than a standard beacon, which may have a transmission period of about 100 ms. For each non-transmission phase in the transmit mode, the AP stops transmitting the FILS discovery frames. Alternatively, the FILS discovery frames can be transmitted non-periodically, e.g., according to a predefined or determined random sequence. The AP may also transmit regular or standard beacons periodically, e.g., with a period of 100 ms. At step 230, the AP determines whether a request has been received from a STA to associate with the AP. The STA sends the request after detecting a FILS discovery frame or a regular beacon from the AP. If a request has not been received, the method 200 returns to step 210, where the AP selects another transmit mode for the FILS discovery frame. If a request has been received, then the method 200 proceeds to step 240, where the AP begins association with the STA. To allow other STAs to discover the AP, the method 200 can return to step 210 and continue to broadcast FILS discovery frames and regular beacons.

Figure 3:
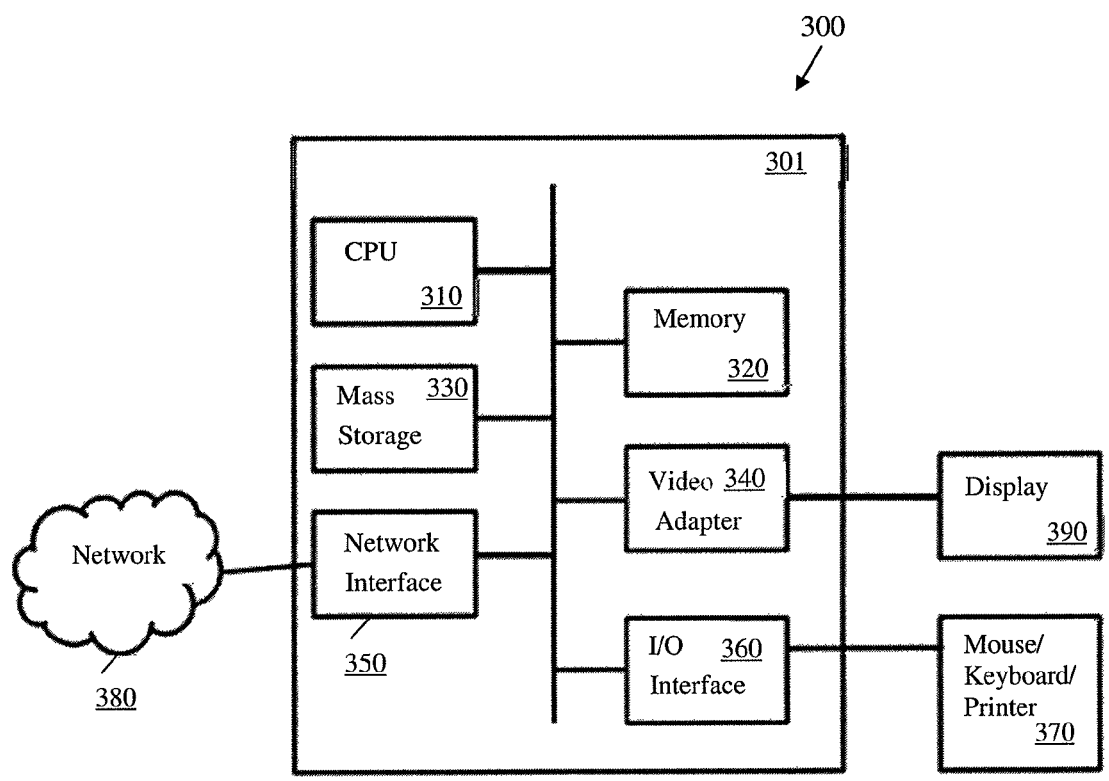
FIG. 3 is a block diagram of a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a speaker, microphone, mouse, touchscreen, keypad, keyboard, printer, display, and the like. The processing unit 301 may include a central processing unit (CPU) 310, a memory 320, a mass storage device 330, a video adapter 340, and an I/O interface 360 connected to a bus. The bus may be one or more of any type of several bus architectures including a memory bus or memory controller, a peripheral bus, a video bus, or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The video adapter 340 and the I/O interface 360 provide interfaces to couple external input and output devices to the processing unit. As illustrated, examples of input and output devices include a display 390 coupled to the video adapter 340 and any combination of mouse/keyboard/printer 370 coupled to the I/O interface 360. Other devices may be coupled to the processing unit 301, and additional or fewer interface cards may be utilized. For example, a serial interface card (not shown) may be used to provide a serial interface for a printer.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for supporting access point (AP) discovery, the method comprising:
   transmitting a plurality of fast initial link setup (FILS) discovery frames at faster time intervals than designated for transmitting standard AP beacons,
   wherein the FILS discovery frames are transmitted in a broadcast pattern according to a transmit mode predefined as a randomized sequence of transmission phases and non-transmission phases, and
   wherein the FILS discovery frames have a smaller size than standard AP beacons.

2. The method of claim 1, wherein the FILS discovery frames comprise association information for establishing successful association between an AP and a handset/station (STA).

3. The method of claim 2, wherein the FILS discovery frames comprise at least a service set identifier (SSID).

4. The method of claim 1 further comprising transmitting a plurality of standard AP beacons at slower time intervals than the FILS discovery beacons.

5. The method of claim 4, wherein the FILS discovery frames are not transmitted when transmission of the FILS discovery frames overlaps in time with transmission of the standard AP beacons.

6. The method of claim 1, wherein the standard AP beacons are in accordance with Institute of Electrical and Electronics Engineers (IEEE) 802.11 standards and have a transmission period of about 100 milliseconds.

7. The method of claim 1, wherein transmitting the FILS discovery frames in a broadcast pattern according to a transmit mode predefined as a randomized sequence of transmission phases and non-transmission phases comprises:
   predefining a plurality of transmit modes each comprising a sequence of transmission and non-transmission phases, the transmission and non-transmission phases are arranged in each of the transmit modes in a random order; and
   selecting a different transmit mode from the predefined transmit modes at different times.

8. The method of claim 1, wherein the FILS discovery frames are transmitted by an AP, wherein at least some of the FILS discovery frames are transmitted during an interval of time at a transmission period of less than 100 milliseconds, and wherein the transmission period allows a handset/station (STA) to discover the AP, associate with the AP, and establish link setup with the AP within about 100 milliseconds in accordance with Task Group for IEEE 802.11ai (TGai) requirement for FILS.

9. The method of claim 1, wherein the FILS discovery frames advertise a basic service set (BSS).

10. An apparatus for supporting access point (AP) discovery, the apparatus comprising:
   a processor; and
   a computer readable storage medium storing programming for execution by the processor, the programming including instructions to:
      transmit a plurality of fast initial link setup (FILS) discovery frames at faster time intervals than designated for standard AP beacons,
      wherein the FILS discovery frames are transmitted in a broadcast pattern according to a transmit mode predefined as a randomized sequence of transmission phases and non-transmission phases, and
      wherein the FILS discovery frames have a smaller size than standard AP beacons.

11. The apparatus of claim 10, wherein the FILS discovery frames comprise a service set identifier (SSID).

12. The apparatus of claim 11, wherein the FILS discovery frames further comprise a network identifier.

13. The apparatus of claim 11, wherein the FILS discovery frames further comprise any combination of robust secure network (RSN) indication, an optional basic service set (BSS) load, an optional one or more BSS identifiers (BSSIDs).

14. The apparatus of claim 11, wherein the FILS discovery frames further comprise any combination of one or more supported rates, a power constraint, a robust secure network (RSN) indication, basic service set (BSS) load, a BSS average access delay, and one or more BSS identifiers (BSSIDs).

15. The apparatus of claim 10, wherein the programming includes further instructions to:
   transmit a plurality of standard AP beacons at a slower time intervals than the FILS discovery frames; and
   stop transmitting the FILS discovery frames when transmission of the FILS discovery frames overlaps in time with transmission of the standard AP beacons.

16. The apparatus of claim 10, wherein the instructions to transmit the FILS discovery frames in a broadcast pattern according to a transmit mode predefined as a randomized sequence of transmission phases and non-transmission phases include instructions to:
   predefine a plurality of transmit modes each comprising a sequence of transmission and non-transmission phases, wherein the transmission and non-transmission phases are arranged in each of the transmit modes in a random order; and
   select a different transmit mode from the predefined transmit modes at different times.

17. A network component supporting access point (AP) discovery, the network component comprising:
   a processor; and
   a computer readable storage medium storing programming for execution by the processor, the programming including instructions to:
      broadcast a standard AP beacon for advertising a basic service set (BSS) repeatedly at subsequent time intervals; and
      broadcast a fast initial link setup (FILS) discovery frame for advertising the BSS repeatedly at faster subsequent time intervals than for the standard AP beacon,
      wherein the FILS discovery frame is transmitted in a broadcast pattern according to a transmit mode predefined as a randomized sequence of transmission phases and non-transmission phases, and
      wherein the FILS discovery frame has a smaller size than the standard AP beacon.

18. The network component of claim 17, wherein the FILS discovery frame comprises one or more data elements that are compressed, the one or more data elements include a service set identifier (SSID) that is truncated in size via hashing.

19. The network component of claim 17, wherein the FILS discovery frame comprises a bitmap that indicates one or more data elements, the one or more data elements include a service set identifier (SSID).

20. The network component of claim 17, wherein the FILS discovery frame is transmitted at a first randomized pattern in time, and wherein a second network component broadcasts a second FILS discovery frame repeatedly at subsequent time intervals similar to that for the FILS discovery frame and at a second randomized pattern in time to avoid collision between the FILS discovery frame and the second FILS discovery frame.

21. The network component of claim 17, wherein the FILS discovery frame is transmitted periodically at a first period and the standard AP beacon is transmitted periodically at a second period, and wherein the first period is shorter than the second period.

22. The network component of claim 17, wherein the instructions to transmit the FILS discovery frames in a broadcast pattern according to a transmit mode predefined as a randomized sequence of transmission phases and non-transmission phases include instructions to:
   predefine a plurality of transmit modes each comprising a sequence of transmission and non-transmission phases, wherein the transmission and non-transmission phases are arranged in each of the transmit modes in a random order; and select a different transmit mode from the predefined transmit modes at different times.

* * * * *